UNITED STATES PATENT OFFICE.

JOHN T. LISTER, OF CLEVELAND, OHIO.

HOSE-MAKING MACHINE.

1,316,052.

Specification of Letters Patent.　Patented Sept. 16, 1919.

Application filed February 10, 1916. Serial No. 77,390.

*To all whom it may concern:*

Be it known that I, JOHN T. LISTER, a citizen of the United States, residing at Cleveland, in the county of Cuyahoga and State of Ohio, have invented a certain new and useful Improvement in Hose-Making Machines, of which the following is a full, clear, and exact description.

This invention relates to an apparatus for the production of a tubular fabric, which fabric is produced by the winding of cords upon a mandrel. The operation of the machine is continuous, the tubular fabric being continuously formed and after being formed is cut into suitable lengths.

The particular tubular fabric which is produced by the machine organized as herein illustrated and subsequently described, is utilized as hose, although I do not limit the invention residing in the apparatus itself to the formation of this product only.

Generally speaking, the invention comprises the elements and combinations thereof set forth in the accompanying claims.

Reference should be had to the accompanying drawings forming a part of this specification, in which.

The machine comprises parallel base members, one of which is indicated at 1. Upon these base members are supports 2 and 3. These supports sustain a cylindrical drum 4 which is stationary and which is provided with a hinged side portion or door 5 by which access to the interior of the drum may be obtained. This drum is provided at its upper portion with a pipe 6, which pipe serves for the introduction of heated air or gases, or forms a means by which air may be drawn from the casing. The purpose and function of either operation which has just been described being to remove any excess moisture which may be upon the cords.

Figures 2, 10:
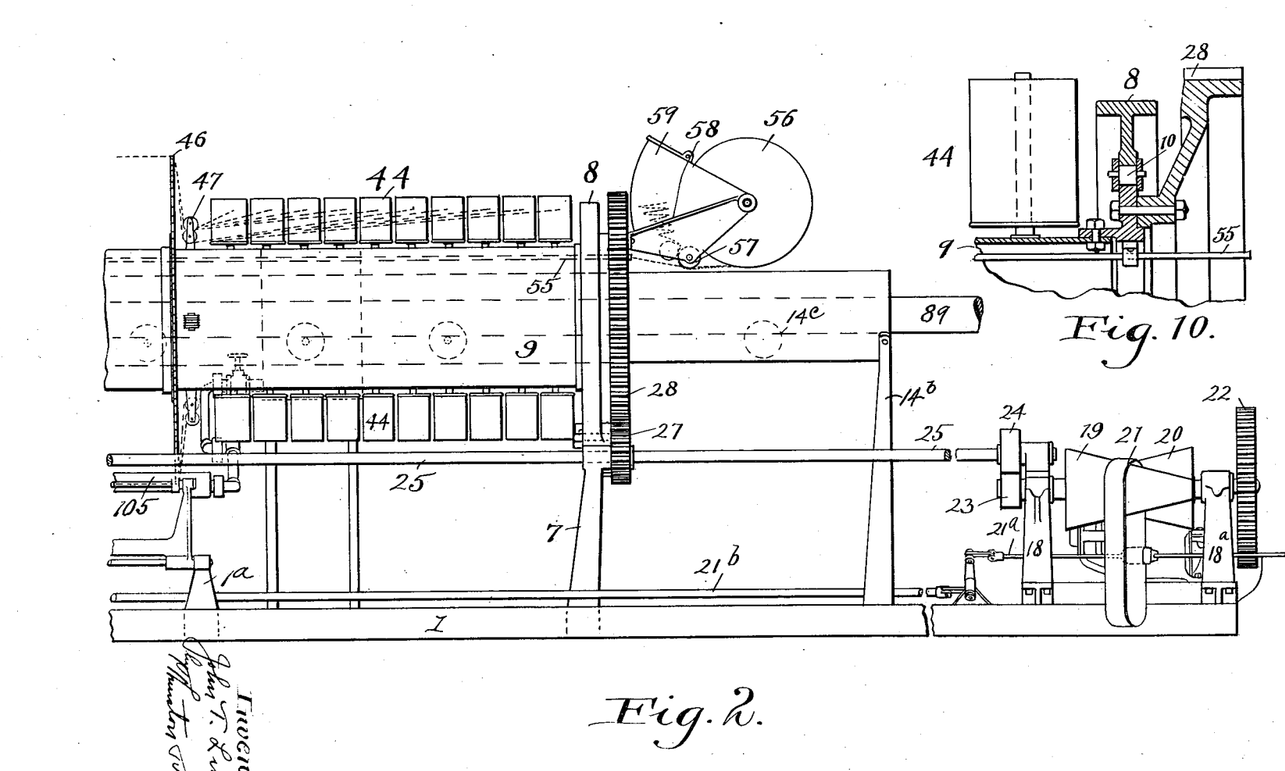
Fig. 2 is a side elevation of the rear portion of the machine, Figs. 1 and 2 taken together forming a side elevation of the entire machine.
Fig. 10 is a sectional elevation showing the mounting of the rear end of a cylindrical drum.

At the rear end of the machine there is a bracket 7. This bracket supports a bearing ring 8. In the bearing ring the rear end of a cylinder 9 is mounted by means of roller bearings as indicated at 10 in Fig. 10.

Figure 3:
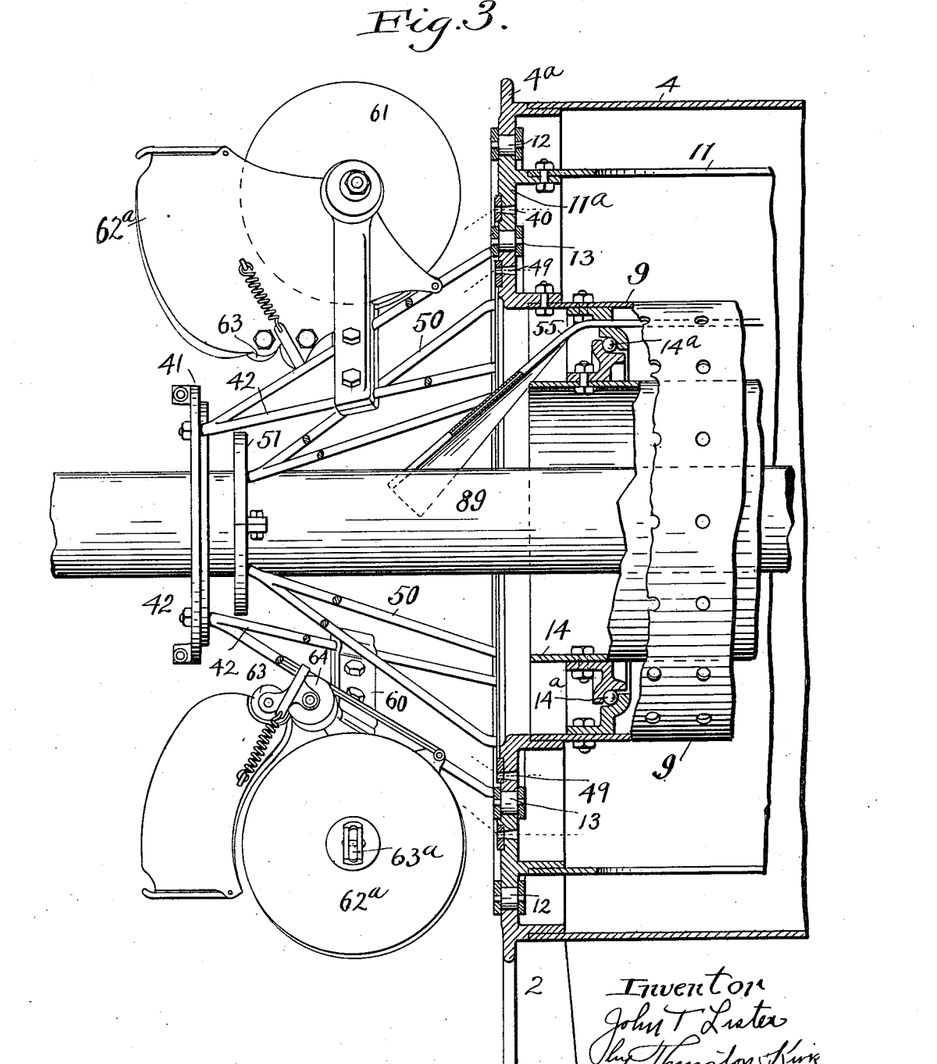
Fig. 3 is an elevation of a portion of the front end of the machine.

Within the cylinder 4 and extending rearwardly from this cylinder is a cylindrical drum 11. This drum at its forward end is mounted in the head $4^a$ of the drum 4. The forward end of the drum 11 is mounted in roller bearings with respect to the head $4^a$ as indicated at 12 in Fig. 3. The cylindrical drum 9 to which reference has before been made extends within the drum 11, the forward end of drum 9 being mounted upon the head $11^a$ of the drum 11. Roller bearings are used for this purpose as indicated at 13 in Fig. 3.

The rear end of the drum 11 is mounted upon the drum 9. This is more clearly shown in Fig. 7 in which the rear end of the drum 11 is provided with a head $11^b$ which carries a gear $11^c$. Upon the drum there is an L-shaped annular member $9^a$ between which last mentioned member and the head $11^b$ are roller bearings 15.

Figure 7:
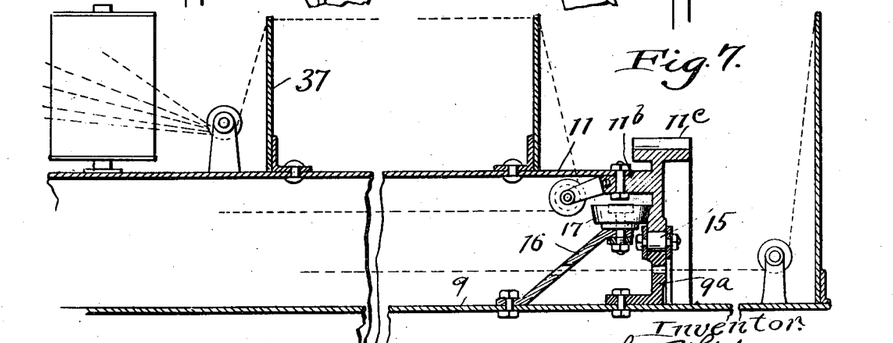
Fig. 7 is a sectional elevation of a portion of the machine.

Upon the drum 9 there are several brackets and rollers. One of the brackets is illustrated at 16 and one of the rollers at 17. These rollers 17 bear against the one side of the head $11^b$ and so take care of any thrusts or relative movement between the drums 9 and 11.

Within the drums 9 and axially arranged with respect thereto is a drum 14. This drum is non-rotatable. At its forward end the drum is mounted through a ball bearing mounting $14^a$ with respect to the drum 9. At the rear end the drum is mounted upon a standard or support $14^b$.

Within the drum 14 are a series of rollers $14^c$. The periphery of each roller is concave and forms a support, while permitting forward movement of a core or mandrel later described.

At the rear end of the machine, there are mounted supports 18 and $18^a$. These supports have parallel shafts journaled in them, which shafts carry the pulleys 19 and 20. These pulleys are cone shaped pulleys and provided with a belt 21, by which one pulley is driven from the other. One of the pulleys is driven from any source of power through a gear 22. Shifting with the belt 21 relative to cone pulleys, will vary the speed of the driven pulley. This belt is shifted by a shifting mechanism 21ª which by means of a rod 21ᵇ is connected with a hand lever 21ᶜ at the head of the machine.

The driven cone pulley drives the gear 23 which meshes with a gear 24 carried upon a shaft 25. The shaft 25 is journaled in the upright support 18, passes through a bearing in the support 7 and the end of the shaft finds bearing in a support or bracket 26.

There is a gear 27 upon the shaft 25 which meshes with a gear 28 which is secured to the rear end of the drum 9. The engagement between gears 27 and 28 forms a driving engagement by which the drum 9 is turned.

Upon the shaft 25 at the forward end thereof, there is a gear 29 which drives a gear 11ᶜ carried by the cylinder 11 and serves to drive the cylinder 11. The shaft 30 is journaled in suitable brackets and this shaft, through suitable gearing generally represented at 31, is driven from the shaft 25.

It will thus be seen that the drum 11 and the drum 9 are caused to rotate in opposite directions.

Figure 6:
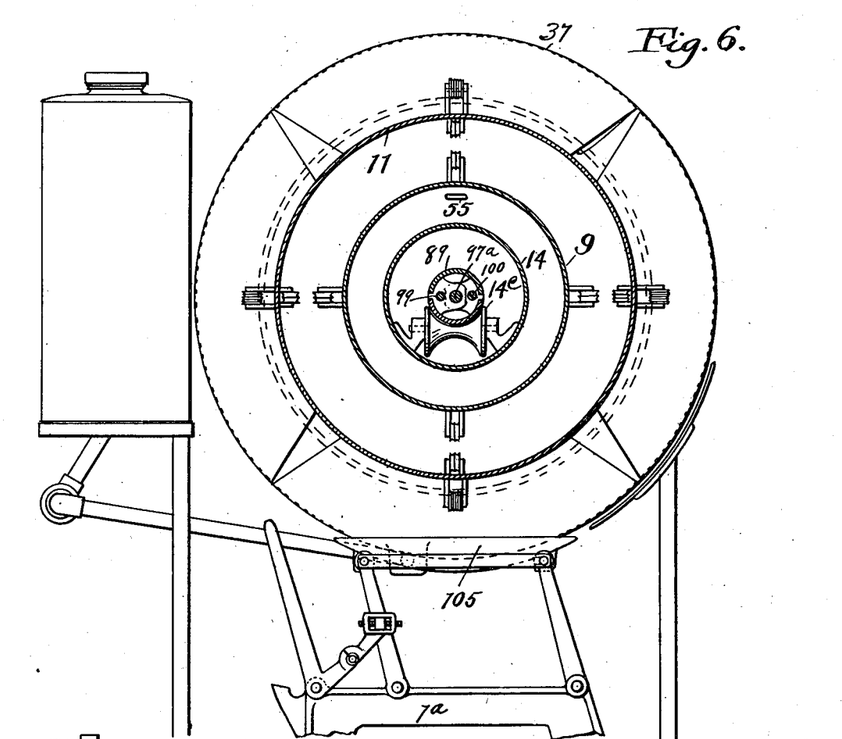
Fig. 6 is a sectional elevation through a portion of the machine.

Upon the drum member 11 there are spindles, each of which is adapted to receive a spool of rubberized fabric, such as represented at 35. Upon the drum 11 at a point behind that upon which the spools 35 are mounted, there are annular members 36 and 37 which are secured to the drum, so as to be in parallel spaced relationship. These annular members 36 and 37 are made up of segments as will be more clearly seen in Fig. 6. The outer periphery of these members 36 and 37 is provided with corresponding notches in each member 36 and 37 being in alinement. Each pair of alined notches in the annular members 36 and 37 are adapted to receive a thread from one of the spools 35 and support the same.

Figure 4:
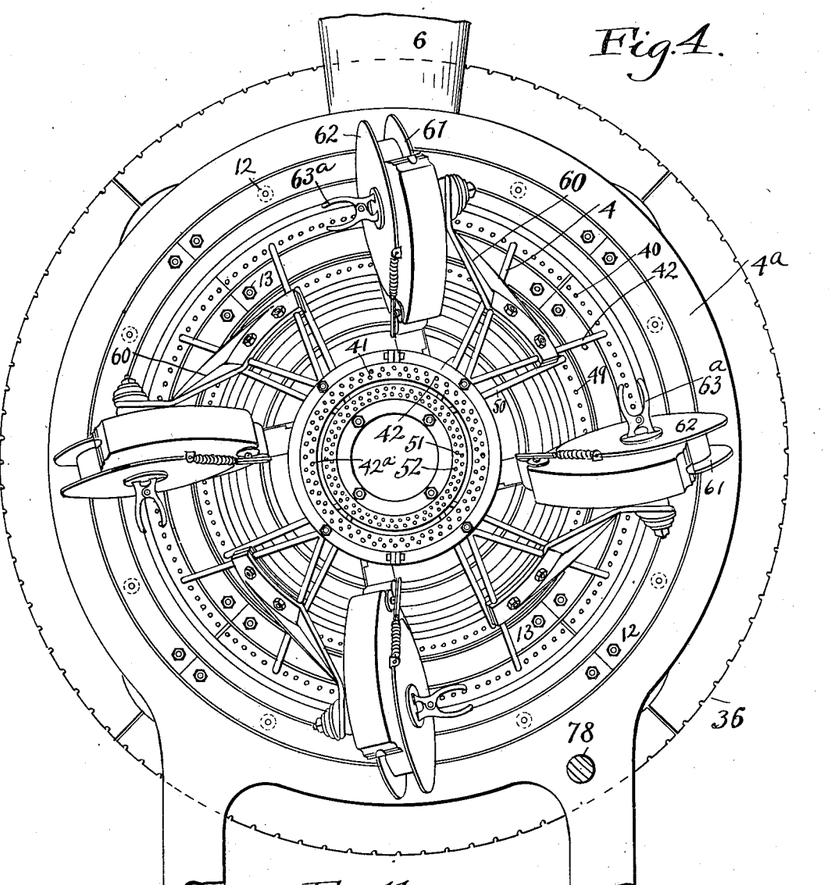
Fig. 4 is an elevation of the front or forward end of the machine with certain portions omitted.

There are guide rollers 38 which receive the thread from the spools prior to passing over the disks 36 and 37. There are rollers such as illustrated at 39 which receive each cord as it passes from the annular member 37 and guide it within the cylinder. The cords extend within the cylinder 11 to the forward end thereof which head of the cylindrical member 11 is provided with a series of openings 40. Through each one of these openings there extends a cord from one of the spools 35. The cord thus passing through the head 11ª extends to a winding head, or as I shall term it, a winder. This comprises a head 41 which is mounted on spacing rods 42. These rods are fastened and secured to the head 11ª to the drum 11, so that the spacing rods 42 and the parts carried thereby rotate with the drum 11. The head 41, as will be seen from Fig. 4, is provided with a plurality of openings 42ª. These openings which receive one of the cords are threaded through the openings 40 in the head 11ª. The cords from the winder 41 are laid upon a mandrel to be described later, which mandrel is non-rotary, but is moved axially with respect to the winding drums and the winders, so that the cords passing through the winder 41 are laid upon the mandrel in a spiral manner.

Upon the cylinder 9 there are arranged a plurality of spindles which support spools 44, these spools carrying rubberized cords. Upon the drum 9 there are also mounted two annular members 45 and 46 which are arranged in spaced parallel relationship. These members 45 and 46 are similar in all respects to the members 36 and 37 and are provided with similar notches in their peripheries. The cord coming from the spools 44 will pass over rollers, one of which is shown at 47, through the notches provided in the annular members 45 and 46 over guide rollers, one of which is shown at 48 and thence parallel with the drum 9 to the forward end thereof. In the head of the drum 9 there are formed openings 49 which will be clearly shown in Fig. 4.

The head of the drum 9 carries certain spacing rods or supports 50. These spacing rods support a head 51, which is a circular member extending around the mandrel or core, the head being provided with openings 52 through each of which openings extends a cord from the openings 49 in the head of the drum 9. It will be apparent that the head 51 revolves with the drum 9, and therefore, the cords which extend through the head and onto the mandrel will be wound upon the mandrel in a spiral fashion.

Attention has been called before to the fact that drums 9 and 11 are caused to rotate in opposite directions. Therefore, the layer of cords wound upon the mandrel by the winder 51 will extend in a direction which is oblique with respect to the layer of cords wound upon the mandrel by the winder 51.

Within the drum 9 there extends throughout the length thereof a flat tube 55, one open end of this tube extending just beyond the rear end of the drum 9, while the opposite end of the tube is given a downward inclination and slightly twisted, so that the end of the tube 55 extends at an angle with respect to the axis of the mandrel and the mouth of the tube being in position to lay a rubberized tape, which the tube is adapted to convey upon the mandrel in advance of the winding of any cord upon the mandrel. The tubular member 55 being carried by the drum 9 will rotate with the drum and thus the tape which is carried by the tubular member 55 will be wound upon the mandrel in a spiral fashion.

At the rear end of the drum 9 a suitable support carries a container 56 within which there is placed a roll of rubberized fabric tape to be supplied to the tubular member 55. This roll of tape passes from the lower part of a reel 56 over a roll 57 and thence to the tubular member 55. This tape usually is carried upon a strap of backing material such as cloth and it is necessary to support the cloth from the strap before the strap passes to the tubular member 55. This is done by causing the cloth to pass between the roll 57 and a roll 58. The drawing of the tape from the reel 56 will cause the roll 57 to rotate and the frictional engagement between the cloth backing and the rolls 57 and 58 will cause the roll 58 to rotate thus forcibly removing the cloth from the tape. This backing cloth is received within a receptacle 59 from which it may be removed at suitable intervals.

At the forward end of the apparatus upon the supports 42 which will be recalled, are carried by the drum 11, there are mounted a plurality of devices for supplying strips of unvulcanized rubber to be wound upon the first layer of cord, viz: that put on by the winder 51, so that the rubber strips will lie between the layers of cord wound upon the mandrel by the winders 51 and 41.

Each of the devices referred to are of similar construction, so a description of one will suffice. A bracket 60 is fastened adjacent the spacing rods 42. Upon this bracket there is fastened one part of the reel 61. This reel is adapted to receive a roll of unvulcanized rubber. Coöperating with the reel 61 is a removable cover 62 and a grip-handle 63$^a$ by which cover 62 may be manipulated and secured to the reel 61. Upon each bracket there is also carried adjacent the reel 60 a receptacle 62$^a$, which receptacle is adapted to receive the backing tape or cloth upon which unvulcanized rubber is laid at the time of its manufacture, into strip or sheet form.

At the end portion of each receptacle 62 there is a roller 63, which lies against a roller 64. Rubber tape passing from the reel 61 passes over the roller 64 and the backing cloth being in the first instance partially stripped from the rubber strap is caused to pass between the rollers 63 and 64. The rubber strip is directed on to the outer surface of the layer or cords placed upon the mandrel by the winder 51 and the movement of the strip of rubber incident to the winding and from the fact that the mandrel moves forward causes the roller 64 to be rotated and this rotation of the roller 64 coöperating with the roller 63 causes the tape to be stripped from the rubber, the tape accumulating in the receptacle.

Inasmuch as the reels 61 are mounted upon the rods 42 which are secured to the head of drum 11, the reels will rotate with the drum and so will wind the rubber strip which they supply upon the layer of cords supplied by the head of winder 51 in a spiral fashion.

After the cord from the winders 41 and 51 has laid upon the mandrel, the fabric is compressed and rolled by rollers which engage with the tubular fabric and exert a desired amount of pressure for their purpose. These rollers are indicated at 66, 67, 68 and 69. One of the rollers is formed with a concave peripheral surface, the radius of the concave surface at the periphery being substantially the same as the radius of the mandrel or core, so that these rollers as they engage the fabric upon the mandrel of cord will press the fabric into conformity with the cord. Each of the rollers is made up of a central section 70 and disk-like sections 71. These disk-like sections may move axially with respect to the central portion 70 and with respect to the disks themselves. This construction insures that the cords will not be stretched during the pressing process for any unevenness in friction between the various parts of the roller and the tubular fabric will be relieved against by the fact that portions of the roller may move at different rates of speed than other portions thereof.

The rollers 66, 67, 68 and 69 are positively driven, all of them in the same direction. The roller 67 is mounted upon a shaft 67$^a$; the roller 68 is mounted upon a shaft 68$^a$; the roller 69 is mounted upon a shaft 69$^a$, while the roller 66 is mounted upon the shaft 66$^a$. The shaft 69$^a$ is connected to the shaft 66$^a$ by means of a beveled gear 69$^b$ and so the shafts are each connected with the adjacent shaft, except that on the opposite side of the shaft 69$^a$ to that which we have just been considering, there is a gear 72 which meshes with a gear 73, the last mentioned gear meshing with a gear 74 carried upon a shaft 75. This last mentioned shaft carries a gear 76 which meshes with a gear 77 carried upon the shaft 78. The shaft 78 is driven by a geared connection with the shaft 30.

The rollers 66, 67, 68 and 69, as they are turned, press so tightly against the cords on the mandrel that the cords and core upon which the cords are wound must move forward in accordance with the rate at which the rollers are driven.

It will appear that the drums carrying the winding heads, the pressure rollers and the cord winders, are all driven from common operating mechanism and move in a fixed relationship.

Figure 1:
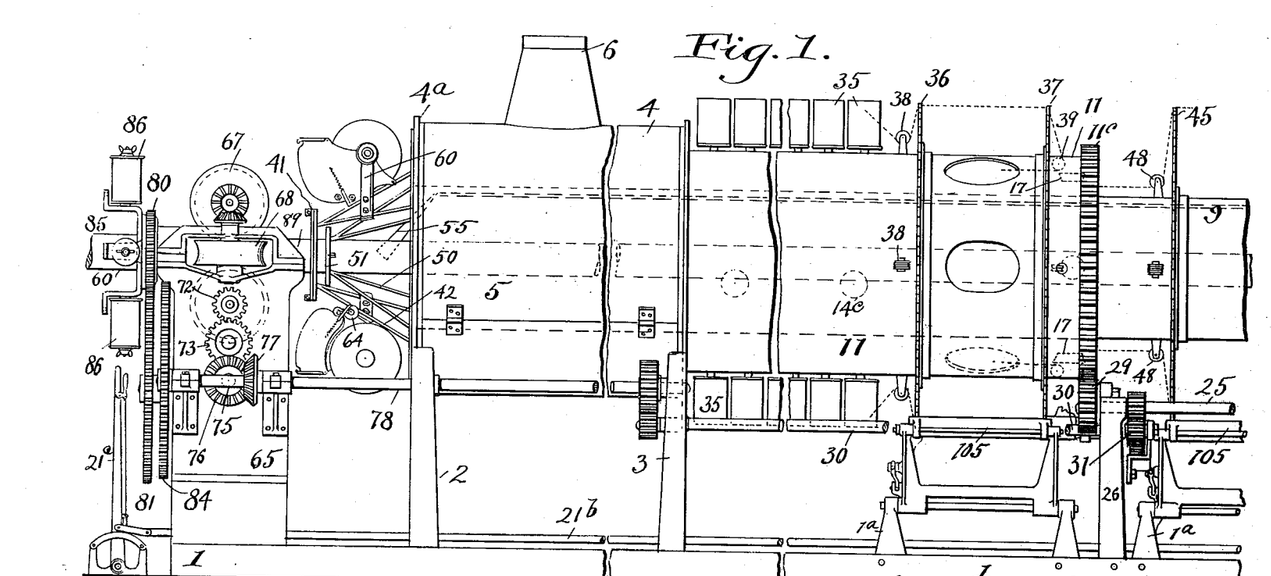
Figure 1 is a side elevation of a forward portion of the machine.
Figure 5:
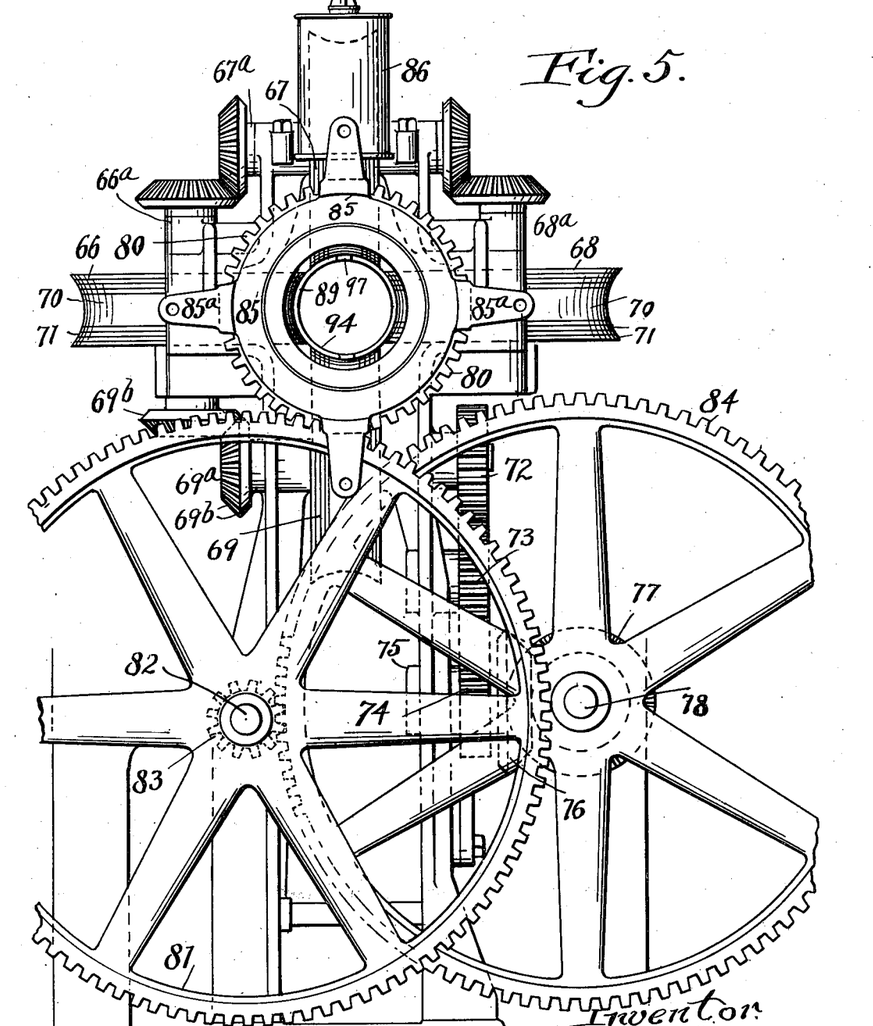
Fig. 5 is an elevation of the front or forward portion of the machine with portions omitted.

Upon the forward end of the support 65 there is journaled a gear 80. This gear is open at the central portion thereof, so that the mandrel may extend and pass through the gear. The gear 80 meshes with the gear 81 which is carried by a shaft 82. Upon the last mentioned shaft is a gear 83 which in turn meshes with a gear 84, the gear 84 being carried upon the shaft 78. The foregoing construction will be clear from an inspection of Figs. 1 and 5.

The gear 80 carries a bracket generally represented at 85. This bracket has arms 85$^a$ upon which are supported receptacles. These receptacles receive and hold cord which preferably is a heavy cord, and this cord is wound upon the outside of the tubular fabric. It will be seen from the construction that the cord as it is fed from the receptacle 82 onto the tubular fabric on the mandrel will be wound upon the fabric in a spiral fashion due to the fact that the mandrel moves forward through the gear, while at the same time the receptacles 86 are rotated about the mandrel due to the geared driving connection which has heretofore been described. The outside layer of cord may be wound from one or more sources. I have shown four sources from which simultaneously supply cord is to be wound.

After the tubular fabric has passed beyond the point at which the cord is put upon the outside of the fabric, the hose is a completed article. The hose is cut into suitable sections and the core or mandrel is removed from the sections thus cut.

For the purpose of facilitating the moving of the core or mandrel, the core is made so that it may collapse, and furthermore, the core is so made that sections may be joined to each other so that sections of the core may be continuously supplied at the rear end of the machine and fastened to sections which are passing through the machine so as to permit the core being continuously built up.

As has been generally intimated heretofore, the core upon which the cords are wound is a straight mandrel and moves in line with respect to the drums 9 and 11 through the drums, through the central openings in the winders 51 and 41, between the presser rollers 66, 67, 68 and 69 and through the openings in the gear 80 which is at the forward end of the machine. The core may be generally represented at 89 and comprises sections three of which are represented at 90, 91 and 92. These sections of the core abut against each other end on end and are so secured to each other that they form a substantially continuous and uniform structure.

Each core section is made up of two surface parts 93 and 94 and these surface parts rest upon and are engaged by an upper support 95 and a lower support 96. The upper support is formed with a central ridge or extension 97 which is flush with the surfaces of the side portions 93 and 94 when the parts are assembled. The lower supporting member 96 is similarly formed and the side members 93 and 94 when assembled will appear substantially as shown in Fig. 9.

Each of the members 95 and 96 has dowel pins such as represented at 98. These dowel pins extend slightly beyond the surface of the members which carry them and into openings which are formed in the side members 93 and 94. This construction will be seen by reference to Fig. 9. The dowel pins hold the side members 93 and 94 in engagement with the members 95 and 96 and prevent any relative movement. Each of the members 95 and 96 extend throughout the length of each section and at the central portion of each of the members 95 and 96 there are inward extensions 95$^a$ and 96$^a$. Through each extension there are openings having tapered walls, as indicated at 95$^e$ and 96$^b$.

Figures 8, 9:
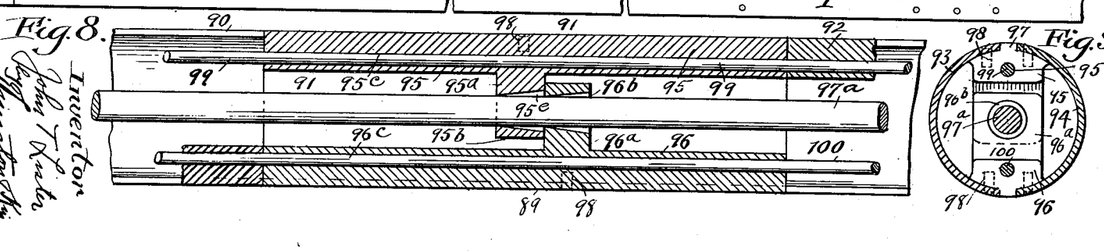
Fig. 8 is a longitudinal section showing the construction of the core.
Fig. 9 is a transverse section showing the construction of the core.

A rod 97$^a$ is adapted to extend through the openings in the extensions 95$^a$ and 96$^a$ and as the rod is passed through these openings the members 95 and 96 are pushed outwardly to occupy the positions shown in Figs. 8 and 9. It will be seen that the depth of the extending portions 95$^a$ and 96$^a$ is less than the space between the portions 95 and 96 when these parts are in assembled position, so that when rod 97$^a$ is subsequently drawn it will permit the parts 95 and 96 to move toward each other, which in turn will release the members 93 and 94 from being held by the dowel pins. Therefore the portions 95 and 96 of each core section may be withdrawn from the tubular fabric and subsequently the parts 93 and 94 of the core.

The rod 97$^a$ is, of course, made in sections and these various sections are secured together in any desired manner. The core is formed at the rear end of the machine.

Through each of the members 95 and 96 of each core section, there are longitudinal openings 95$^c$ and 96$^c$. These openings are adapted to receive longitudinally extending rods 99 and 100. The rods extending from section to section will keep the sections in alinement and in proper position to insure continuity of the core. The rods 99 and 100 are, of course, in sections of suitable length and are joined end on end as the cord is built up at the rear end of the machine.

Figure 11:
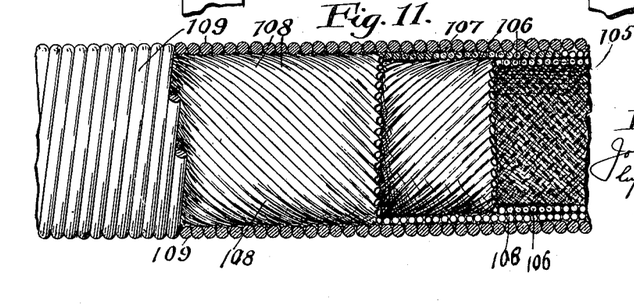
Fig. 11 is an elevation with portions and sections showing the finished product produced by the apparatus to be described.

The machine as thus described will produce a hose such as illustrated in Fig. 11, having an inner fabric lining 105 next two layers of cord 106 and 108 with an intermediate layer of unvulcanized rubber 107 and an outside layer of cords 109 of larger diameter than those used to form layers 106 and 108. The layer 109 has the individual strands wound close together and tightly upon the other cords.

By slight modification and merely following out the ideas of construction herein given, a greater number of winding heads may be provided and thus form the hose with as many layers similar to layers 106 and 108 as may be desired to produce the required strength in the finished hose.

This same result may be secured by utilizing two similar machines, the first machine having the outside cord winding mechanism 86 omitted, while the second machine utilizes the tubular member 55 to supply and wind a strip of unvulcanized rubber instead of the fabric strip.

Then sections of the hose emerging from machine number one without the outside layer of large cords could be put through machine number two and which would put on a layer of raw rubber and two more layers of cords and in addition the outside layer of layer cords.

Obviously a single machine could be manipulated to give the same results.

I claim:

1. A hose forming machine comprising a plurality of telescoping tubular members, the inner of said members being stationarily supported, the other tubular members being supported to have rotation, means for driving the tubular members in different directions, winders carried by said movable tubular members, and a movable mandrel extending through the inner tubular member and adjacent the winding members, and means bearing upon the tubular fabric beyond the winders for compressing the fabric upon the core.

2. In a hose making machine, the combination with a plurality of winders which are turned in opposite directions, a mandrel upon which the winders are adapted to wind threads or cords in layers, means for winding upon the inner layer of cords a covering of unvulcanized rubber, means for compressing the tubular fabric formed after it is passed beyond the winders, and means for winding a covering material upon the outside of the tubular fabric after it is compressed.

3. In a machine for forming hose, the combination of a moving mandrel, means for winding material upon the moving mandrel, a plurality of winders each adapted to wind a layer of rubberized cords upon the material first laid upon the mandrel, means for winding a covering of unvulcanized rubber between the layers of cord produced by each winder, means for compressing the tubular fabric after it passes beyond the winders, and means for winding material upon the tubular fabric after it has been compressed.

4. In a hose forming machine, the combination with a moving mandrel, means for winding one or more layers of thread or cord upon the mandrel, a plurality of rollers grooved upon their periphery adapted to engage with the fabric upon the mandrel to form the fabric to the mandrel, and means for winding covering material upon the outside of the fabric, after the fabric has been acted on by said rollers.

5. In a hose making machine, the combination of a rigid moving mandrel, independent devices each of which wind a layer of cords upon the mandrel, means for driving said devices in different directions, rollers adapted to engage with the cords upon the mandrel to conform the cords to the mandrel, said rollers causing the mandrel to move forwardly, means for driving the said rollers in a definite relation to the speed at which the winding devices are driven.

6. In a hose making machine, the combination with a straight mandrel, a plurality of winding devices adapted to wind cords upon the mandrel to form tubular fabric, a pressing device for pressing the fabric upon the mandrel, said pressing device being in alinement with the winding devices, and means in alinement with the pressing means and the winding devices for winding covering material upon the outside of the tubular fabric subsequent to the pressing operation.

7. In a hose making machine, the combination with a stationary cylinder, a mandrel movably supported within said cylinder, a cylinder surrounding said first mentioned cylinder, a flat tube extending through said cylinder, means for supplying tape at one end of said cylinder, the opposite end of the tube being formed so that the mouth lies adjacent the mandrel, means for turning the said cylindrical member whereby tape-like material will be wound as a covering upon the mandrel, a winding device associated with the mandrel for winding rubberized cord upon the covering.

8. In a hose making machine, the combination with a stationary cylinder, a mandrel movably supported within said cylinder, a second cylinder member surrounding the first cylinder and adapted to turn upon the first mentioned cylinder, a source of supply of a covering material carried by the second mentioned cylinder, a conducting device for said covering material extending within and carried by the second cylinder, said conducting device having the forward part thereof inclined so as to lie adjacent the mandrel, a winding device carried by the second cylinder for winding a plurality of cords upon the cover previously wound upon the mandrel, and means for turning the second mentioned cylindrical member.

9. In a hose making machine, the combination with a stationary cylinder, a plurality of rollers supported within the cylinder, a mandrel adapted to move upon said rollers, a second cylindrical member surrounding the first cylindrical member and rotatably mounted with respect to the first cylindrical member, a source of supply of covering material mounted upon the second mentioned cylindrical means for connecting the said material through the second mentioned cylinder to the forward part thereof said means directing the covering material upon the mandrel whereby the covering material is wound upon the mandrel, a winding device carried by the second mentioned cylindrical member and adapted to wind a plurality of rubberized cords upon the cover material previously placed in the mandrel, and means for rotating the cylinder.

10. In a hose making machine, the combination with a rotatable cylinder, said cylinder being supported in a stationary support at one end, an outer cylindrical member surrounding the first mentioned cylindrical member, said cylindrical member being mounted at one end upon the first mentioned cylindrical member and at its opposite end mounted in a fixed support the first mentioned cylindrical member being rotatably mounted at one end within the outer cylindrical member, a stationary cylindrical member within the first mentioned cylindrical member, said stationary cylindrical member at one end being fixedly mounted upon a support at its opposite end having a mounting which permits the first mentioned or rotatable cylindrical member to rotate, a mandrel extending through the stationary cylindrical member, and a winding device carried by the rotatable cylindrical member and the outer cylindrical member, and means for driving the cylindrical members carrying the winders in opposite directions.

11. In a hose making machine, the combination with a movable straight rigid mandrel, a plurality of winding devices associated with the mandrel and each adapted to wind a layer of rubberized cord upon the mandrel thereby forming a tubular fabric, a plurality of roller members each formed with a grooved periphery the curve of which grooved periphery is complementary to the radius of the mandrel, the said rollers engaging with the tubular fabric upon the mandrel to compress the tubular fabric into conformity with the mandrel.

12. In a hose making machine, the combination with a movable straight rigid mandrel, of a plurality of winding devices associated with the mandrel, each of said winding devices being adapted to wind a layer of rubberized cord upon the mandrel, thereby forming a tubular fabric, a plurality of rollers each provided with a grooved periphery adapted to conform with the mandrel, the said rollers being disposed to engage the tubular fabric to compress the same into conformity with the mandrel, and means for driving the said rollers.

13. In a hose making machine, the combination with a movable mandrel, a plurality of winding devices associated with the mandrel and adapted each to wind a layer of rubberized cord upon the mandrel thereby forming a tubular fabric, a rotatable winding member associated with the mandrel and adapted to wind a layer of covering material upon the outside of the cords laid by the aforesaid winding devices, and means for driving the said winding means.

14. In a hose making machine, the combination with a moving mandrel, a plurality of winding devices associated with the mandrel, each device adapted to wind a layer of cords upon said mandrel, a winding means associated with the mandrel, said winding means having a plurality of sources of supply of cover material, means for driving the winding means thereby winding a cover material upon the outside of the cords laid on the mandrel by the aforesaid winding devices.

15. In a hose making machine, the combination with a collapsible moving mandrel which is made up of longitudinal sections that are joined together in longitudinal alinement, means for winding a plurality of layers of rubberized fabric upon the said mandrel, thereby forming a tubular fabric which may be removed by cutting the tubular fabric into sections and collapsing the mandrel.

16. In a hose making machine, the combination with a moving mandrel adapted to be formed in longitudinal sections, each of the sections being collapsible, longitudinally extending rods within the mandrel for holding the mandrel in expanded condition and for holding the sections in alinement, and means for winding cords upon the said mandrel.

17. A collapsible core for hose making machines comprising a plurality of surface sections, oppositely disposed supporting members, alined openings in the said supporting members adapted to receive a rod, thereby to push the supporting members apart and hold the surface sections in position.

18. A collapsible core for hose making machines comprising a plurality of surface sections, a plurality of inner supporting members adapted to engage the surface sections, alined openings in the said inner members adapted to receive a cylindrical rod thereby to force the inner member outwardly to engage and hold the surface sections.

19. A collapsible core for hose making machines comprising a plurality of outer sections, openings formed in said sections, a plurality of inner supporting members, pins carried by said inner members adapted to engage with the openings in the surface sections, there being alined openings in the inner supporting members, a rod adapted to extend through said alined openings, thereby forcing the outer members into engagement with the surface sections to hold the same.

20. A collapsible core for hose making machines comprising surface sections, oppositely disposed inner supporting members engaging means between the inner members and the surface sections, inwardly extending lugs formed on the inner members with openings in the said lugs, a rod adapted to extend through the openings in said lugs, thereby forcing the inner members outwardly into engagement with the surface sections.

21. A collapsible core for hose making machines, comprising surface sections, inner members adapted to engage and support the surface sections, said inner members having lugs which lugs have conical shaped openings through them and a rod adapted to extend through the openings in said lugs and force the inner supporting members outwardly into engagement with the surface sections.

22. A collapsible core for hose making machines, comprising a pair of semi-circular surface sections, a pair of oppositely disposed supporting members adapted to extend longitudinally of the surface sections, said supporting members having inwardly extending lugs which overlap, said lugs having alined openings formed in them, and a rod extending through the lug for forcing the inner members outwardly.

23. A collapsible core for hose making machines comprising a pair of semi-circular surface sections, openings in said surface sections, a pair of oppositely disposed supporting members, pins carried by said members and adapted to engage with the openings in the surface sections, said inner members having inwardly extending lugs which overlap each other, the said lugs being provided with conical shaped openings, a rod extending through the said openings, thereby forcing the inner members outwardly and into engagement with the surface sections.

24. A collapsible core for hose making machines, comprising a plurality of sections arranged in the end, each of said sections comprising surface forming sections, inner members within the surface sections, longitudinal openings formed in said inner members, which openings in the adjacent sections are in alinement, rods extending through the said openings and past adjacent sections, thereby holding the sections in alinement, said inner members in each section of the core being provided with openings, a rod adapted to extend past a plurality of sections and through the alined openings in said lugs, whereby the inner members of each section are pushed outwardly into engagement with the surface sections.

In testimony whereof, I hereunto affix my signature.

JOHN T. LISTER.